Nov. 19, 1957 — G. W. MILLER ET AL — 2,813,487
DEFLAGRATION INHIBITED POWDER GRAINS
AND METHOD OF MAKING SAME
Filed Sept. 26, 1945

INVENTORS
GLEN W. MILLER
PAUL A. LONGWELL
BRUCE H. SAGE
BY
ATTORNEY

United States Patent Office 2,813,487
Patented Nov. 19, 1957

2,813,487

DEFLAGRATION INHIBITED POWDER GRAINS AND METHOD OF MAKING SAME

Glen W. Miller, Covina, Paul A. Longwell, Pasadena, and Bruce H. Sage, Altadena, Calif., assignors to the United States of America as represented by the Secretary of the Navy Application September 26, 1945, Serial No. 618,764

5 Claims. (Cl. 102—98)

This invention relates to propellant grains and methods of inhibiting the burning thereof, and has particular relation to the inhibiting of extruded propellant grains employed in rocket motors and to a method whereby specified surfaces of propellant grains may be inhibited to control their deflagration characteristics.

It is essential for the successful operation of a rocket motor that the burning period and the burning area of the propellant grain be fully controlled and predictable at any and all times during the burning period. That is, for any given application the propellant grain must be controlled so that it will burn for a specified length of time within very close tolerances, as well as burn at a predetermined pressure which is declining (regressive) or increasing (progressive), as conditions warrant, without erratic behavior. When the size of the propellant grain and the duration of the burning period thereof are increased, the problem of propellant grain design is rendered more difficult, especially if a relatively fast burning propellant grain is employed.

An object of the present invention is to provide a method of controlling the burning of a propellant grain whereby certain selective surfaces may be so treated that their burning properties are inhibited, thereby artificially controlling the effective burning area of the propellant grain throughout its burning period.

Another object of the invention is to provide a method of inhibiting a propellant grain which is particularly applicable where the propellant grain must undergo a prolonged burning period; that is, where a burning period of several seconds, as distinguished from a burning period of only a fraction of a second, is required.

Still another object of the invention is to provide a propellant grain having deflagration inhibiting coatings or coverings on selected surfaces of the grain, so arranged as to extent and location that the effective burning area functioning at any stage of the burning period may be predetermined, in order that the magnitude of the pressure generated thereby may be rigidly controlled within specified limits.

A further object of the invention is to provide a propellant grain which will remain structurally stable for a maximum proportion of its burning life, thereby avoiding the occurrence of peak pressures which are caused by the breaking up of propellant grains during burning.

These and other objects of the invention will be readily understood by reference to the accompanying drawing, in which.

Figure 1:
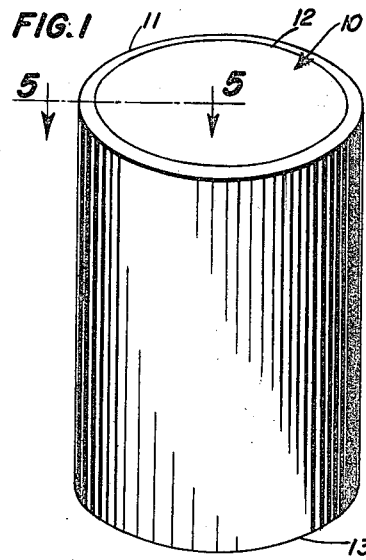
Fig. 1 is a perspective view of a cylindrical propellant grain wherein the entire surface except one end is inhibited.

In the construction shown in Fig. 1, a solid cylindrical propellant grain 10 is inhibited by a tubular shell 11 composed of a non-explosive, flame-resistant material. Although a number of inhibiting materials have been tried, such as steel and paper impregnated with fire-resistant material, cellulose acetate has given the most satisfactory results. This may be partially attributed to the fact that the temperature coefficient of expansion of cellulose acetate is very close to that of extruded double-base propellants, such as mixtures of nitrocellulose and nitroglycerin. One such double-base propellant is disclosed in Patent No. 2,495,216. The inhibitor shell 11 is cemented or bonded to the surface of the propellant grain by means of a suitable solvent, bonding agent or plasticizer 12, such as a solution of about 28 percent methyl cellosolve (ethylene glycol monomethyl ether) dissolved in ethyl cellosolve (ethylene glycol ethyl ether). During the bonding, it is believed that the plasticizer 12 diffuses into the propellant grain 10, as well as into the inhibitor shell 11, thereby effecting a tight bond. It is further believed that the plasticizer may act as a solvent and dissolve the treated surfaces of both the inhibitor member and the propellant grain and upon evaporation of the plasticizer, a secure bond is obtained. In addition to the inhibitor shell 11, an inhibitor end plate 13 is applied to one end of the propellant grain and secured thereto by means of the plasticizer or bonding agent.

In order to insure proper burning of the propellant grain, the bond between the inhibitor shell and the propellant grain must be complete; that is, occluded air spaces and voids between the inhibitor shell and the propellant grain must be avoided in order to prevent undesirable deflagration and fissuring of the propellant grain during burning thereof.

Figure 4:
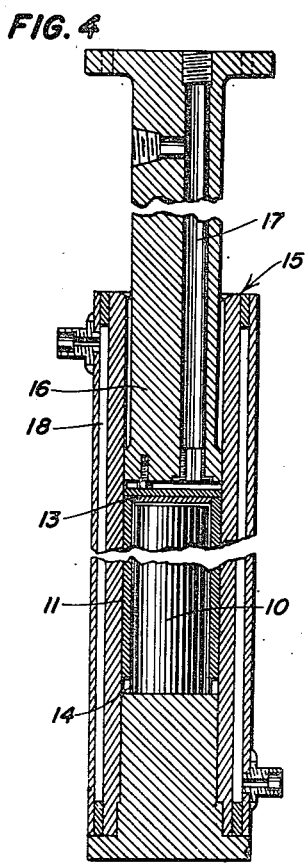
Fig. 4 is a sectional view of a press which has been successfully used for bonding the inhibitor material to the propellant grain shown in Fig. 1.
Figure 5:
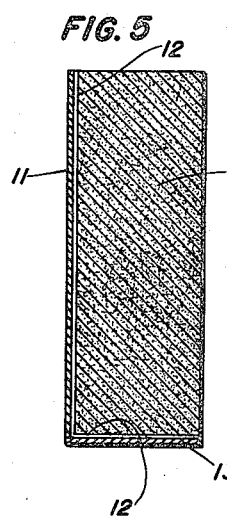
Fig. 5 is a cross-sectional view of a portion of an inhibited cylindrical propellant grain taken on the line 5—5 of Fig. 1.

The bonding of tubular propellant grains may be readily accomplished by means of a press such as is shown in Fig. 4. The inhibiting material, preferably cellulose acetate, is molded in the form of a tube 11 which slips freely but snugly over the cylindrical propellant grain 10, after the contacting surfaces of either or both the propellant grain and the inhibitor shell have been coated with the plasticizer 12, and the inhibitor end plate 13 has been sealed onto one end of the grain with plasticizer. The propellant grain with the inhibitor shell and end plate bonded thereto is inserted in the chamber 14 of the press 15. During operation of the press, the ram 16 descends into the chamber, air within the chamber being exhausted through an exhaust passage 17, preferably by means of a vacuum pump (not shown). It is desirable that a high vacuum be maintained in the chamber for at least 3 or 4 minutes before pressing is initiated in order to eliminate the possibility of air being occluded in air voids existing between the propellant grain and the inhibitor shell. A heating jacket 18 is provided around the chamber through which a heating fluid is circulated to maintain the temperature inside the chamber at about 130° to 160° F. After the chamber has been exhausted of air and heated to the proper temperature, pressure in the range of about 10,000 to 16,000 pounds per square inch is applied to the press for a period of time ranging from approximately 2 to 15 minutes in order to effect a complete, uniform bond between the inhibitor shell and the propellant grain.

When the propellant grain encased within its inhibitor shell is burned in a rocket motor, ignition and burning is confined to the uninhibited end portion which burns uniformly and neutrally, inasmuch as the area of this end remains practically constant. As the propellant grain undergoes burning, that portion of the inhibitor shell which is adjacent to the burning end of the grain, wastes away in the intense heat of burning and the grain is evenly consumed. Although various thicknesses of inhibitor shell have been used, an inhibitor thickness of 0.10 to 0.20 inch is preferred on large grains having relatively long burning periods. It has been found that a propellant grain made in this manner has been caused to burn uniformly for as long as 20 seconds.

Although a cylindrical propellant grain has been described above, the grain may be formed in a variety of shapes and selected areas thereof may be inhibited, depending upon the type and size of propellant grain desired and upon the conditions of operation. In a preferred embodiment, the propellant grain 19, shown in Figs. 2, 3 and 6, has a cruciform cross-section provided with radiating ribs 20. This novel construction is of particular advantage in that the radiating ribs, due to their inhibited ends, support the grain in the motor tube throughout the entire burning period. This ribbed construction further permits the grain to burn evenly and simultaneously along the sides of the radiating ribs throughout the entire length of the grain, as will be hereinafter more fully explained. In accordance with the present invention, the outer extremities or ends 21 of these ribs are covered by inhibitor strips 22, preferably composed of cellulose acetate, and bonded thereto by a suitable plasticizer 23. It has been found that when inhibitor strips are used, sufficiently good bonding may be obtained without the use of pressing equipment such as is shown in Fig. 4. In bonding the inhibitor strips, a preferred bonding agent is a solution of 5 percent by weight cellulose acetate dissolved in diacetone alcohol. In this instance, it is believed that the diacetone alcohol acts as a solvent and dissolves the treated surfaces of the propellant grain and the cellulose acetate inhibitor strips, thereby providing a tight bond upon evaporation of the solvent. The inhibitor end plates 32, similar in cross section to the cruciform grain 19 and provided with bosses 24, are bonded to the ends 25 of the grain, the bosses 24 being positioned in the holes 26, thereby further securing the end plates.

Figure 2:
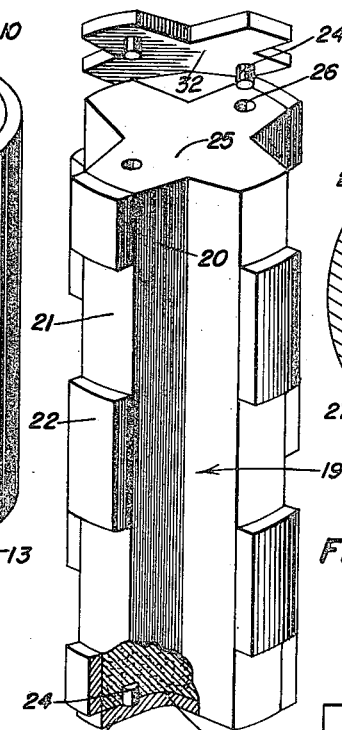
Fig. 2 is a partially exploded and partially sectional, perspective view of an inhibited cruciform-shaped grain.
Figure 6:
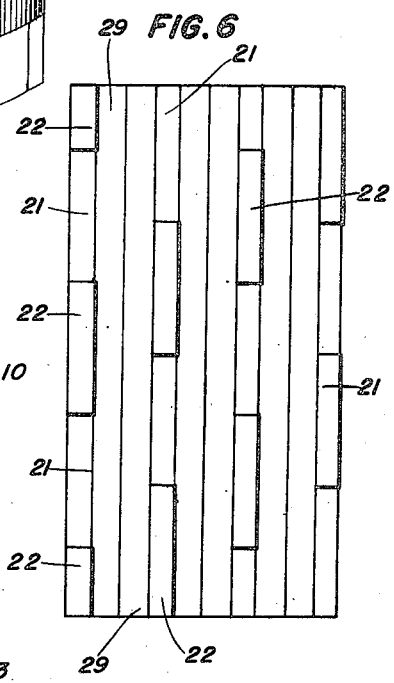
Fig. 6 is a developed view of a propellant grain, such as is shown in Figs. 2 and 3, illustrating a preferred manner in which the ribs thereof are inhibited only in part.

Although the inhibitor strips 22 may be continuous from end to end of the propellant grain, they are preferably interrupted and staggered as is shown in Figs. 2 and 6. It has been found that when the inhibitor strips are interrupted or staggered, the uninhibited portions burn regressively, while the inhibited portions burn progressively. Thus, if the relative proportions of inhibited areas and uninhibited areas are chosen properly, the resulting rate of burning of the propellant grain may be so controlled as to become constant or neutral.

Figure 3:
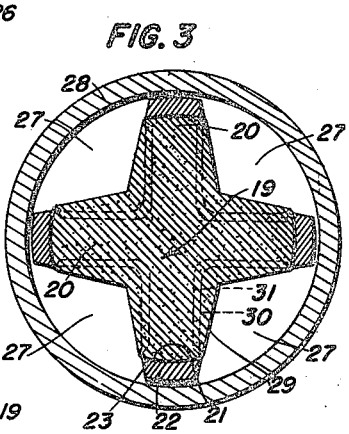
Fig. 3 is a cross-sectional view of a propellant grain of cruciform section wherein the radial extremities of the ribs are provided with inhibitor strips.

Burning of the cruciform propellant grain takes place simultaneously in each of the four triangular spaces 27 between the propellant grain ribs 20 and the surrounding rocket motor shell 28 throughout the entire length of the grain as shown in Fig. 3. With this construction, the burning surface 29 increases in area as the burning progresses, so that the rate of burning of the grain accelerates but without undesirable irregularities. Thus, the ribs are continually burned away to give a smaller cross-sectional area and a greater surface area as indicated progressively by the reference characters 30 and 31 which depict the progress of burning. It will be noted that neither the inhibited edge surfaces 21 nor the inhibited ends 25 covered by the inhibitor end plates 32 are subject to burning. With this construction the ribs remain until the burning reaction is practically complete, thereby holding the propellant grain in position and preventing it from breaking up, which would increase the burning area to an undesirable extent. Thus, it has been found that the inhibiting of selected surfaces of a propellant grain serves not only to control the burning, but also to provide maintenance of a structurally stable propellant grain during the major portion of the burning reaction. As previously stated, this is an important function of the inhibitor strips as it minimizes breaking up the propellant grain which would result in attendant, erratic burning.

It will be noted that the extent and configuration of the reacting surface of the propellant grain are controlled throughout the burning period; that is, full control of the effective burning area is maintained at all times. Thus, not only the total burning time may be controlled, but also the pressure developed at any time during the burning period may be controlled within relatively close limits.

We claim:

1. The method of controlling the burning of a propellant grain which comprises plasticizing a surface of a fire-resistant inhibitor member and a predetermined surface area of said grain with a plasticizing and bonding agent, positioning the plasticized surface of said fire-resistant inhibitor member on the plasticized area of said grain, and bonding said member to said grain by the application of heat and pressure.

2. A propellant grain for use in rocket motors, comprising a propellant body having extended portions adapted to support the grain in a rocket motor, deflagration inhibitor members on the outer extremities of said extended portions to inhibit deflagration, thereby causing said portions to remain and support the propellant grain for substantially the entire burning period of the propellant grain, and means bonding said members to said grain.

3. A propellant powder grain for use in rocket motors, comprising a body having extended portions adapted to support the grain in a rocket motor, means controlling the inroads of deflagration of said grain, consisting of deflagration inhibiting strips on the outermost surfaces of said portions of the powder grain in an interrupted and staggered pattern, and means bonding said strips to said grain.

4. A propellant powder grain for use in rocket motors, comprising a body having longitudinally extended leg portions adapted to support the grain in a rocket motor, means controlling the inroads of deflagration of said grain consisting of deflagration inhibiting strips on the outermost surfaces of the leg portions of the powder grain in longitudinally spaced relation and in circumferentially offset relation to present an interrupted and staggered pattern of distribution of said strips, and means bonding said strips to said grain.

5. A propellant powder grain for use in rocket motors, comprising a body of cruciform cross-sectional shape defining circumferentially distributed longitudinally extended leg portions adapted to support the grain in a rocket motor, means controlling the inroads of deflagration of said grain consisting of deflagration inhibiting strips adhered to the outermost surfaces of the leg portions of the powder grain in longitudinally spaced relation on each leg portion and in circumferentially offset relation on adjacent leg portions to present a spiral pattern of distribution of said strips, and means bonding said strips to said grain.

References Cited in the file of this patent

UNITED STATES PATENTS

| | | |
|---|---|---|
| 778,788 | Maxim | Dec. 27, 1904 |
| 2,464,181 | Lauritsen | Mar. 8, 1949 |

FOREIGN PATENTS

| | | |
|---|---|---|
| 17,994 | Great Britain | Sept. 21, 1894 |
| 502,560 | France | Feb. 24, 1920 |